United States Patent [19]

Thomas, Jr.

[11] Patent Number: 4,587,269

[45] Date of Patent: May 6, 1986

[54] ONE STEP PROCESS FOR PREPARING ANION EXCHANGE POLYMERS

[75] Inventor: Martin Thomas, Jr., Southbridge, Mass.

[73] Assignee: Ionics Incorporated, Watertown, Mass.

[21] Appl. No.: 776,301

[22] Filed: Sep. 16, 1985

[51] Int. Cl.⁴ .......................... C08F 2/06; C25B 13/08
[52] U.S. Cl. ........................................ 521/38; 521/63; 526/312; 204/296
[58] Field of Search ...................... 204/98, 128, 182.4, 204/252, 296; 521/38, 63; 526/312

[56] References Cited

U.S. PATENT DOCUMENTS

| | | | |
|---|---|---|---|
| Re. 27,401 | 6/1972 | Wichterle et al. | 204/296 |
| 2,800,445 | 7/1957 | Clarke | 204/296 |
| 3,247,133 | 4/1966 | Chen | 204/296 |
| 3,276,991 | 10/1966 | Hani et al. | 204/296 |
| 3,276,992 | 10/1966 | Hani et al. | 204/296 |
| 3,686,100 | 8/1972 | Parrini et al. | 204/296 |
| 3,714,010 | 1/1973 | Süszer | 204/296 |
| 3,935,086 | 1/1976 | Misumi et al. | 204/296 |
| 4,221,642 | 9/1980 | De Nora et al. | 204/296 |
| 4,231,855 | 11/1980 | Hodgdon et al. | 204/296 |
| 4,374,720 | 2/1983 | MacDonald | 204/296 |
| 4,460,568 | 7/1984 | Strasilla et al. | 526/312 |

FOREIGN PATENT DOCUMENTS

| | | | |
|---|---|---|---|
| 0004029 | 9/1979 | European Pat. Off. | 204/296 |
| 52-189 | 4/1977 | Japan | 204/296 |

Primary Examiner—John F. Niebling
Assistant Examiner—Terryence Chapman
Attorney, Agent, or Firm—Norman E. Saliba

[57] ABSTRACT

This invention relates to the manufacture of anion selective membranes in a "one-step" process by co-polymerization of a crosslinking methacrylate ester and a methacrylic ester containing a quaternary ammonium group. The anion selective membranes are obtained directly with no further processing needed.

8 Claims, No Drawings

ONE STEP PROCESS FOR PREPARING ANION EXCHANGE POLYMERS

BACKGROUND OF THE INVENTION (1) Field of Invention

This invention is directed to highly selective anion exchange membranes prepared from aqueous solutions of quaternary ammonium methacrylic esters in a polar solvent. The membranes which are especially useful in electrodialysis applications are obtained with active exchange sites in a "one-step" procedure and require no further processing.

(2) Description of the Prior Art

The usual technique for the production of anion selective membranes similar to those described in the invention involves co-polymerizing methacrylate esters containing amine groups of the tertiary type, with crosslinking methacrylate esters. The resulting polymer with pendant tertiary amine groups is further reacted so that the tertiary amine groups are converted to the quaternary ammonium salts producing an anion selective membrane structure. The prior art has disadvantages in that the polymerization reaction is carried out in non-water soluble organic solvents that have to be washed out with a water soluble alcohol, such as methanol, before the polymer sheet can be subjected to an alkylation step which involves quaternization to the ammonium salt.

In U.S. Pat. No. 4,231,855 (Hodgdon, et.al.), which is incorporated herein by reference, there is disclosed such a process for synthesizing aliphatic quaternary ammonium ion-exchange polymers. The method involves the polymerization of a non-ionic methacrylate ester monomer containing tertiary amine groups such as, for example, dimethylaminoethyl methacrylate (DMAEMA) with a non-ionic polyunsaturated crosslinking methacrylate ester monomer containing vinyl groups such as ethylene glycol dimethacrylate (EGDM) in an appropriate non-water soluble organic solvent. The resulting non-ionic polymer is then made ionic by reacting the polymer with an alkylating reagent such as methyl chloride ($CH_3Cl$) to convert the tertiary amine groups to the quaternary ammonium groups.

The present invention comprises an improvement over the methods of the prior art by using water soluble polar solvents. The methanol washings of the prior art (to remove the organic solvent) as well as the second procedural step whereby pendant tertiary amine groups are transformed into guaternary ammonium salts using hazardous alkylating reagents (such as methyl chloride gas) are eliminated. The resulting anion exchange membranes have high ion-exchange capacities and low electrical resistance. Additionally, the use in the present invention of polar non-polymerizable solvents which can be removed from the polymer by water washes instead of methanol washes, and elimination of the alkylation step represents a large cost savings. Also, the elimination of methyl chloride gas is an added cost savings, as well as a solution to an environmental problem that under present regulation requires strict handling of hazardous waste.

SUMMARY OF THE INVENTION

The invention comprises the co-polymerization of a polyunsaturated crosslinking methacrylate ester monomer containing at least two vinyl groups with a methacrylate ester containing a quaternary ammonium salt group in the presence of a water soluble polar solvent. Suitable polyunsaturated crosslinking methacrylate esters are the polyol methacrylate ester monomers. These include the glycol dimethacrylates such as ethylene glycol dimethacylate (EGDM), neopentyl glycol trimethacrylate, polyethylene glycol dimethacrylate, trimethylol propane trimethacrylate, bis-phenol A dimethacrylate and pentaerythritol tri and tetra methacrylate.

Suitable quaternary ammonium methacrylate esters include the quaternized products of methacrylate esters with alkyl halides (i.e. methyl chloride), benzyl chloride, allyl chloride, chloroacetamide chloroacetone, dimethyl or diethylsulfuric acid, etc. The methacrylate esters are those containing amine groups of the tertiary type such as dimethylaminoethyl methacrylate, diethylaminoethyl methacrylate (DEAMA), t-butylaminoethyl methacrylate, 3-(dimethylamino)-2-hydroxypropyl methacrylate and the like. The preferred quaternary ammonium methacrylate ester monomer is methacryloyloxyethyltrimethylammonium chloride which is produced by quaternizing dimethylaminoethyl methacrylate with methyl chloride. Such monomers are available commercially such as Sipomer Q-6-75 from Alcolac Co. (Maryland) or Ageflex FM-1QMC-75 from CPS Chemical Co., Inc. (New Jersey), having the following structure:

This ethanaminium compound also known as N,N,N,-trimethyl-2-[2-methyl-1-oxo-2-propenyloxy]-chloride is available as a 73–80% active material in water.

The anion polymer of the present invention may be synthesized using a wide ratio range of te quaternized monomer to the cross-linking monomer but it is preferred that the starting liquid mix comprise anywhere from 0.3 to 0.7 moles of the quaternized monomer to each mole of the cross-linking monomer and most preferred is the mole ratio of 0.4 to 0.6.

Suitable free radical generating compounds which can be used as initiators for the co-polymerization reaction are peroxides, hydroperoxides and azo initiators. The water soluble peroxide initiators includes 2, 4-pentonedione, potassium persulfate, hydrogen peroxide and the like. The hydroperoxide initiators include t-butyl hydroperoxide. The axo initiators include 2, 2' azobis (2-amidinopropane) dihydrochloride and 4, 4'-azobis (4-cyanopentanoic acid). The range of initiator used is between 0.01% to 2% of the total weight of monomers.

Suitable water miscible polar compounds whichh can be used as non-polymerizable (NP) solvents or diluents are especially the straight chain alcohols i.e. 1-propanol, 1-butanol, 1-pentanol, etc. and water mixtures of the same. The volume of solvent present during polymerization determines the percent porosity and substantially fixes the solvent or water holding capacity or content of the resulting polymer. The solvent or NP employed is typically 20–50% by volume of the final liquid formulation but may be more or less if so desired.

The solvent or solvent system employed must form a homogeneous solution when all the constituents used in the preparation of the anion resin are mixed together. Further, a solvent or solvent system meeting the solubility criteria must also produce a clear, hard resin upon polymerization of the monomeric mixture. Various solvents were screened with the results that some solvents dissolved only one compound of the mixture while other solvents did not form a totally homogeneous solution when all components were combined.

It was unexpectedly discovered that the lower aliphatic primary alcohols (especially $C_1$ to $C_5$) are preferred because they form a homogeneous solution when all the constituents used in the preparation of the polymeric membranes are mixed and the resulting finished polymeric product is clear and hard. Whereas certain branched chain (secondary and tertiary) alcohols such as 2-propanol and tertiary butyl alcohol were found to dissolve all the constituents, but the resulting polymeric membranes were translucent and floppy (little stiffness) and therefore not preferred as anion exchange membranes.

The polymerization reaction may be carried out in the temperature range of about 40° C. to about 100° C., but the preferred range is between about 60° to 80° C.

The preferred procedure for preparing the polymer of this invention is further illustrated by the following examples:

EXAMPLE 1

266 milliliters (45 mol percent) of ethylene glycol dimethacrylate (EGDM) are combined with 379 milliliters (55 mol percent) of Ageflex FM-1QMC-75, a (75% aqueous solution of dimethylaminoethyl methacrylate methyl chloride quaternary), 355 milliliters (455 vol %) of 1-propanol (a non-polymerizable solvent or diluent) and 60 milliliters of a 70% aqueous solution of t-butyl hydroperoxide (TBHP) initiator. The homogenous mixture is poured into a tray into which is laid, in alternating fashion, glass plates and modacrylic cloth until the top of the liquid level is reached. The entire tray is placed in an oven and heated to a temmperature of 80° C. during a period of 17 hours. During this cure cycle, the monomer and diluent mix have turned into a solid mass. This excess resin and glass sheets are removed to yield the membranes as cloth sheets which are surrounded and impregnated with polymerized resin. These anion selective membranes are placed in water overnight and thereafter analyzed to give the following properties:

Mullen Burst Strength: 130 psi
Thickness: 0.060 Cm
Resistivity: 9.9 Ohm-Cm (0.01 N NaCl) (1000 Hz)
Water Content: 45.8%
Capacity: 2.09 Milliequivalents ($Cl^-$), gram dry resin

EXAMPLE 2

218 milliliters (45 mol percent) of ethylene glycol dimethacrylate (EGDM) are combined with 415 milliliters (55 mol percent) of Ageflex FM-1Q80, (an 80% aqueous solution of diethylaminoethyl methacrylate dimethyl sulfate quaternary), 367 milliliters (45 vol%) of 1-propanol and 20 milliliters of a 70% aqueous solution of t-butyl hydroperoxide (TBHP) initiator. The homogenous mixture is poured into a tray and treated in the manner described in Example 1. The resulting membranes are placed in water overnight and thereafter analyzed to give the following properties:

Mullen Burst Strength: 135 psi
Thickness: 0.058 Cm
Resistivity: 10.1 Ohm-Cm
Water Content: 46.0%
Capacity: 2.22 Meq. ($Cl^-$) dry gm.

While a particular embodiment of this invention is shown above, it will be understood that the invention is obviously subject to variations and modifications without departing from its broader aspects.

The embodiment of this invention in which an exclusive property or priviledge is claimed are defined as follows:

1. A method of preparing a cross-linked substantially insoluble anion exchange polymer comprising reacting a mixture of a non-polymerizable water soluble polar solvent, a polyol methacrylate ester monomer containing at least two vinyl groups with a methacrylate ester monomer containing a quaternary ammonium salt group said reaction occuring by heating the mixture in the presence of a polymerization initiator.

2. The method of claim 1 wherein the polyol methacrylate ester is selected from the group consisting of ethylene glycol dimethacrylate, neopentyl glycol dimethacrylate, polethylene glycol dimethacrylate, trimethylol propane trimethacrylate, bis-phenol A dimethacrylate, pentaerythritol tri and tetramethacrylate.

3. The method of claim 1, wherein the non-polymerizable water soluble polar solvent is selected from the lower primary alcohols having 1-5 carbon atoms.

4. The method according to claim 1 wherein the said quaternary ammonium salt group selected from the group having the formula:

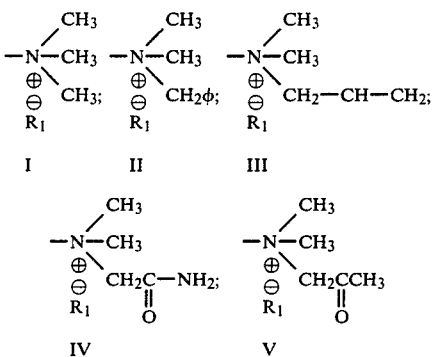

in which $R_1$ represents a univalent and $0$ represents phenyl.

5. The structure according to claim 4 wherein R is selected from the group consisting of $Cl^-$, $Br^-$, $I^-$, $NO^-_{3,}$ ($SO_4^=$) and mixtures thereof.

6. The method of claim 1 wherein the methacrylate ester monomer containing a quaternary ammonium salt group comprises the quaternized products of methacrylate esters with alkylating agents selected from the group consisting of alkyl halides, benzyl chloride, dimethyl sulfate, dimethylsulfuric acid, diethyl sulfuric acid and mixtures thereof.

7. The method of claim 6, wherein the methacrylate ester which are alkylated contain tertiary amine groups and are selected from the group consisting of dimethylaminoethyl methacrylate, diethylaminoethyl methacrylate, t-butylaminoethyl methacrylate, 3-(dimethylamino)-2-hydroxypropyl methacrylate and mixtures thereof.

8. A method of preparing an anion exchange polymer comprising reacting a mixture of a polar solvent selected from the group consisting of methanol, ethanol, 1-propanol, 1-butanol, 1-pentanol and water mixtures thereof, a cross-linking monomer of ethylene glycol dimethacrylate with the quaternized product of dimethylaminoethyl methacrylate or diethylaminoethyl methacrylate with methyl chloride, said reaction occurring by heating the mixture in the presence of a polymerization initiator.

* * * * *